(12) United States Patent
Guthrie et al.

(10) Patent No.: US 8,913,406 B2
(45) Date of Patent: Dec. 16, 2014

(54) PARALLELED POWER CONVERTERS WITH AUTO-STAGGER START-UP

(75) Inventors: Stephen Guthrie, Allen, TX (US); Subarna Pal, Wylie, TX (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/491,673

(22) Filed: Jun. 8, 2012

(65) Prior Publication Data

US 2012/0327688 A1  Dec. 27, 2012

Related U.S. Application Data

(60) Provisional application No. 61/500,710, filed on Jun. 24, 2011.

(51) Int. Cl.
*H02M 1/00* (2006.01)
*H02M 1/36* (2007.01)
*H02M 3/28* (2006.01)

(52) U.S. Cl.
CPC ............ *H02M 1/36* (2013.01); *H02M 3/285* (2013.01)
USPC .......................................................... 363/49

(58) Field of Classification Search
USPC .............. 363/15, 17, 49, 50, 65, 79; 323/225, 323/271, 272
See application file for complete search history.

(56) References Cited

U.S. PATENT DOCUMENTS

| | | | |
|---|---|---|---|
| 5,172,291 A | 12/1992 | Bakely et al. | |
| 5,910,709 A * | 6/1999 | Stevanovic et al. | 315/225 |
| 6,166,934 A * | 12/2000 | Kajouke et al. | 363/65 |
| 6,414,860 B1 * | 7/2002 | Li | 363/49 |
| 6,456,511 B1 | 9/2002 | Wong | |
| 7,485,987 B2 | 2/2009 | Mori et al. | |
| 7,843,178 B1 | 11/2010 | Houk et al. | |
| 8,253,395 B2 | 8/2012 | Irissou et al. | |

(Continued)

FOREIGN PATENT DOCUMENTS

| | | |
|---|---|---|
| CN | 1578090 A | 2/2005 |
| CN | 101860186 A | 10/2010 |
| CN | 102075086 A | 5/2011 |
| WO | 0182460 A1 | 11/2001 |

OTHER PUBLICATIONS

Non-Final Office Action, U.S. Appl. No. 13/474,578 mailed Aug. 19, 2013, 20 pages.

(Continued)

*Primary Examiner* — Gary L Laxton
*Assistant Examiner* — Alex Torres-Rivera
(74) *Attorney, Agent, or Firm* — General Electric Company (57) ABSTRACT

A power conversion system includes a shared output bus and a plurality of power conversion units coupled to the shared output bus. Each power conversion unit includes a power converter having a converter output coupled to the shared output bus and a delay generator that generates a start-up delay for the power converter if a pre-bias value of a bus voltage on the shared output bus is greater than a predefined threshold. Each power conversion unit also includes a voltage controller that controls the converter output subsequent to the start-up delay and maintains a current sourcing condition of the converter output during start-up of the power converter. The power conversion system also includes a load that is coupled to the shared output bus. A method of operating a power conversion unit is also provided.

19 Claims, 6 Drawing Sheets

(56) References Cited

U.S. PATENT DOCUMENTS

| | | |
|---|---|---|
| 2003/0026115 A1* | 2/2003 | Miyazaki .................. 363/53 |
| 2004/0008528 A1 | 1/2004 | Umemoto et al. |
| 2004/0130919 A1 | 7/2004 | Sullivan et al. |
| 2007/0008752 A1* | 1/2007 | Senouci .................. 363/49 |
| 2008/0074158 A1* | 3/2008 | Ryu et al. ................ 327/143 |
| 2009/0108819 A1* | 4/2009 | Liu ........................ 323/238 |
| 2009/0121697 A1 | 5/2009 | Aiura et al. |
| 2010/0033150 A1 | 2/2010 | Irissou et al. |
| 2010/0327688 A1 | 12/2010 | Canini et al. |
| 2011/0109294 A1 | 5/2011 | Larson |
| 2011/0179292 A1 | 7/2011 | Clegg et al. |
| 2012/0313593 A1 | 12/2012 | Knueppel et al. |

OTHER PUBLICATIONS

Notice of Allowance and Notice of Allowability, U.S. Appl. No. 13/474,578 mailed Apr. 2, 2014, 10 pages.

* cited by examiner

PARALLELED POWER CONVERTERS WITH AUTO-STAGGER START-UP

CROSS-REFERENCE TO RELATED APPLICATION

This application claims the benefit of U.S. Provisional Application Ser. No. 61/500,710 filed by Stephen Guthrie and Subarna Pal on Jun. 24, 2011, entitled "Parallel Module Start-up Using Auto-stagger" commonly assigned with this application and incorporated herein by reference.

TECHNICAL FIELD

This application is directed, in general, to power conversion and, more specifically, to a power conversion unit, a method of operating a power conversion unit and a power conversion system employing the power conversion units.

BACKGROUND

DC-DC power conversion units designed with synchronous rectifier output field effect transistors (FET)s or other power switch technology and connected with paralleled outputs utilizing voltage droop for current sharing may have reverse current issues during start-up if isolating circuitry (e.g., OR-ing diodes or FETs) is not used on each of the outputs to prevent sinking current into the power conversion units. Output voltage droop is a feature by which the output voltage regulation set-point is reduced as a function of the output current. For example, the output voltage set-point at no load may be 12.0 Vdc and be reduced to 11.5 Vdc at full load. Unless the power conversion units start with perfect synchronization, one or more units may sink current when powered up using a normal soft start turn-on sequence, since the first unit to start will provide a pre-bias condition to those units which turn on later. The sinking or reverse current can be as large as the over-current protection level of one or more of the sourcing units and may cause damage to those units that are sinking current.

SUMMARY

Embodiments of the present disclosure provide a power conversion unit, a method of operating a power conversion unit and a power conversion system.

In one embodiment, the power conversion unit includes a power converter having a converter output coupled to a shared output bus. The power conversion unit also includes a delay generator configured to generate a start-up delay for the power converter, wherein the start-up delay is activated if a pre-bias value of a bus voltage on the shared output bus is greater than a predefined threshold. Additionally, the power conversion unit includes a voltage controller configured to control the converter output subsequent to the start-up delay and maintain a current sourcing condition of the converter output during start-up of the power converter.

In another aspect, the method of operating a power conversion unit includes measuring a bus voltage on a shared output bus prior to start-up of a power converter and generating a start-up delay for the power converter when a pre-bias value of the bus voltage on the shared output bus is greater than a predefined threshold. The method also includes controlling the power converter subsequent to the start-up delay to maintain a current sourcing condition during start-up of the power converter.

In yet another aspect, the power conversion system includes a shared output bus and a plurality of power conversion units coupled to the shared output bus. Each power conversion unit includes a power converter having a converter output coupled to the shared output bus and a delay generator that generates a start-up delay for the power converter if a pre-bias value of a bus voltage on the shared output bus is greater than a predefined threshold. Each power conversion unit also includes a voltage controller that controls the converter output subsequent to the start-up delay and maintains a current sourcing condition of the converter output during start-up of the power converter. The power conversion system also includes a load that is coupled to the shared output bus.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Many techniques have been proposed to provide soft starting with no reverse current flow into the output. One of these is described in U.S. patent application Ser. No. 13/474,578, filed on May 17, 2012 by Reddy et al, entitled "Monotonic Pre-Bias Start-Up Of A DC-DC Converter" commonly assigned with the present disclosure and incorporated herein by reference. In this approach, a voltage controller measures the pre-bias voltage on the output of the DC-DC converter. If a pre-bias voltage is detected, the voltage controller then calculates a duty cycle that would produce an initial output voltage that is slightly greater than the pre-bias voltage.

By using a control signal (e.g., a PWM duty cycle) that produces a voltage slightly greater than the pre-bias voltage (e.g., 100 mV greater) it ensures that upon start-up, no reverse (sinking) current will flow back into the starting power conversion unit. This PWM duty cycle is then employed at start-up. This approach works well if the pre-bias voltage is relatively constant. However, this approach is inadequate if the pre-bias voltage is rapidly changing.

Embodiments of the present disclosure provide automatic turn-on of two or more parallel coupled power conversion units during a non-simultaneous start-up of the parallel coupled units without the need for additional external circuitry or a synchronization connection between the parallel coupled units. Additionally, these embodiments of the paralleled power conversion units may typically employ intelligent control processors, which may also detect a voltage state of the shared output bus and automatically sequence a turn-on process (i.e., an auto-stagger start-up) of the paralleled power conversion units. A maximum bus load at start-up of the parallel conversion units configured for staggered start may not exceed the full load capability of a single unit.

DC output power conversion units may include those that operate from a DC input as well as those operating from an AC input. In a typical application, this shared output bus may provide power to various point-of-load (POL) modules that in turn power system loads. In many cases, these POLs have a sequenced starting arrangement as the system goes through its initializing process, which may limit the initial start-up maximum load or insure proper system functioning.

Figure 1:
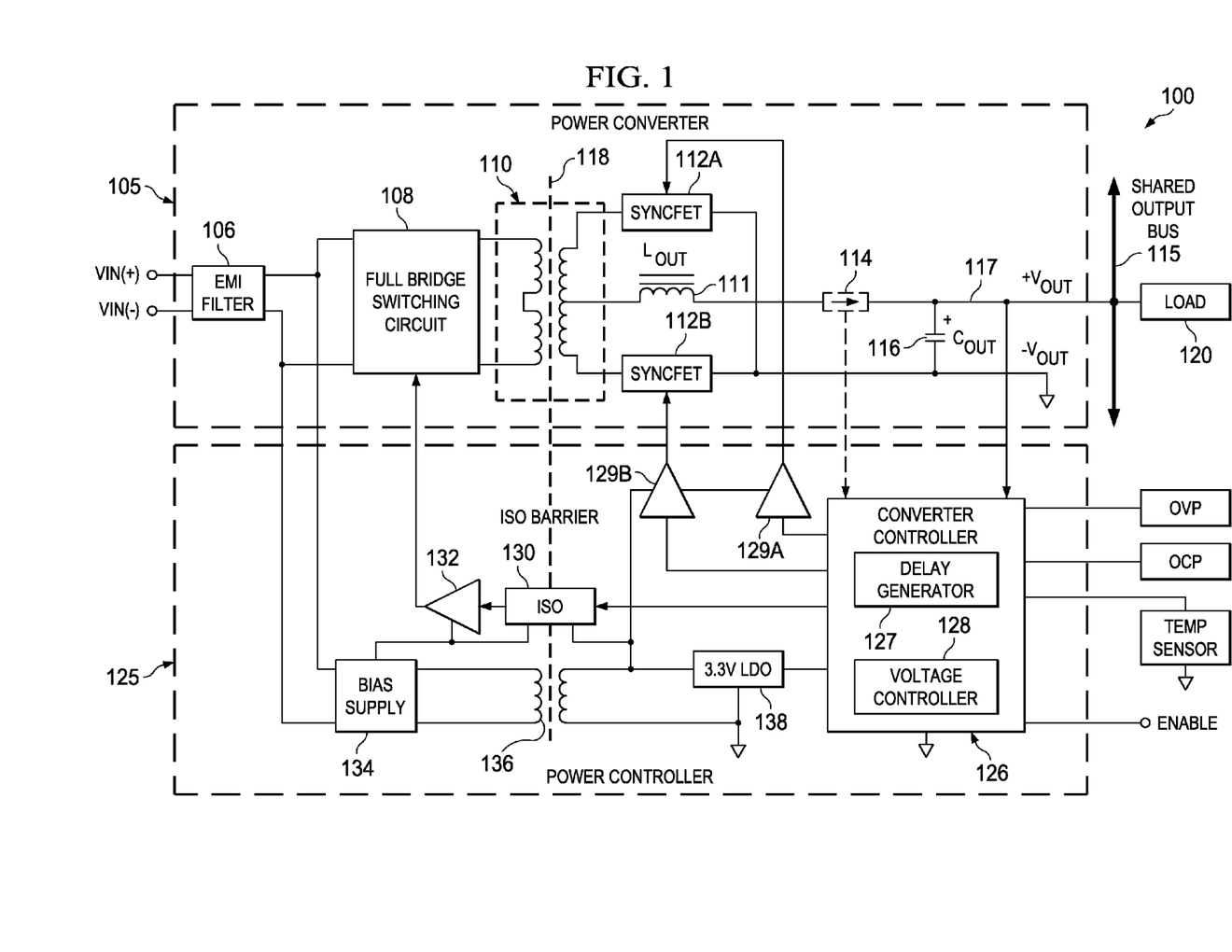
FIG. 1 illustrates a block diagram of a power conversion unit, which employs a secondary control architecture constructed according to the principles of the present disclosure.

FIG. 1 illustrates a block diagram of a DC-DC power conversion unit, generally designated 100, which employs a secondary control architecture constructed according to the principles of the present disclosure. The power conversion unit 100 includes a power converter 105 and a power controller 125. The power converter 105 includes power processing components and some sensing and drive circuitry of the power conversion unit 100. It has primary and secondary stages that are electrically isolated from each other across an isolation barrier 118 and provide separate primary and secondary grounding structures. The power controller 125 also employs the isolation barrier 118 to electrically isolate primary and secondary stage components referenced to the separate grounding structures.

The power converter 105 is connected to convert a DC input voltage Vin to a DC output voltage Vout across a load 120. The power converter 105 includes an electromagnetic interference (EMI) filter 106, a full bridge switching circuit 108, a main power transformer 110, an output inductor 111, first and second synchronous output rectifier switches (e.g., FETs) 112A, 112B, an optional output current sensing unit 114 and an output filter capacitor (Cout) 116. The output filter capacitor (Cout) 116 may include an output filter capacitor contained within the power converter 105 and a filter capacitor that is external to the power converter connected from +Vout to −Vout. The main power transformer 110 forms part of the isolation barrier 118. In addition, the power transformer 110 and output inductor 111 may be combined into an integrated magnetic structure.

The power controller 125 includes a converter controller 126 having a delay generator 127 and a voltage controller 128. The power controller 125 also includes first and second secondary switch drivers 129A, 129B, an optical isolator 130, a primary switch driver 132 and a bias supply unit 134 that is connected through a bias supply transformer 136 to a secondary side DC bias voltage regulator 138. The optical isolator 130 and the bias supply transformer 136 also form part of the isolation barrier 118.

During operation, the EMI filter 106 provides input voltage EMI filtering for the power conversion unit 100. In the present embodiment, the full bridge switching circuit 108 provides a full wave AC signal to primary windings of the main power transformer 110. The secondary windings of the main power transformer 110 then provide a full wave AC secondary signal to the first and second synchronous rectifier output switches 112A, 112B for rectification. A rectified output signal is provided from a secondary winding center tap of the main power transformer 110 to an output filter containing the output inductor 111 and the output filter capacitor 116. The optional output current sensing unit 114 provides an indication of an output current magnitude for the power converter 105.

The power controller 125 provides operating control of the power converter 105 allowing it to deliver output voltage and output current to the load 120, based on established set points and feed back information from a converter output 117. Generally, the converter controller 126 establishes control signals (e.g., pulse width modulation (PWM) signals) that are provided through the primary and first and second secondary switch drivers 132, 129A and 129B to control conduction times of the primary and secondary stages. Alternatively, depending upon the power topology, the converter controller may vary the operating frequency to control the output. The optical isolator 130 provides electrical isolation for primary control signals, as noted above. The bias supply unit 134, bias supply transformer 136 and DC bias voltage regulator 138 provide required secondary supply power that is independent of the operating status of the power converter 105.

The power conversion unit 100 illustrated in FIG. 1 may have other features and components that are not shown but may be required to satisfy system needs. The power conversion unit 100 may also have a digital communication input to its converter controller 126 to provide data to the system or receive input for programming or customization during operation or during the manufacturing process.

Figure 2:
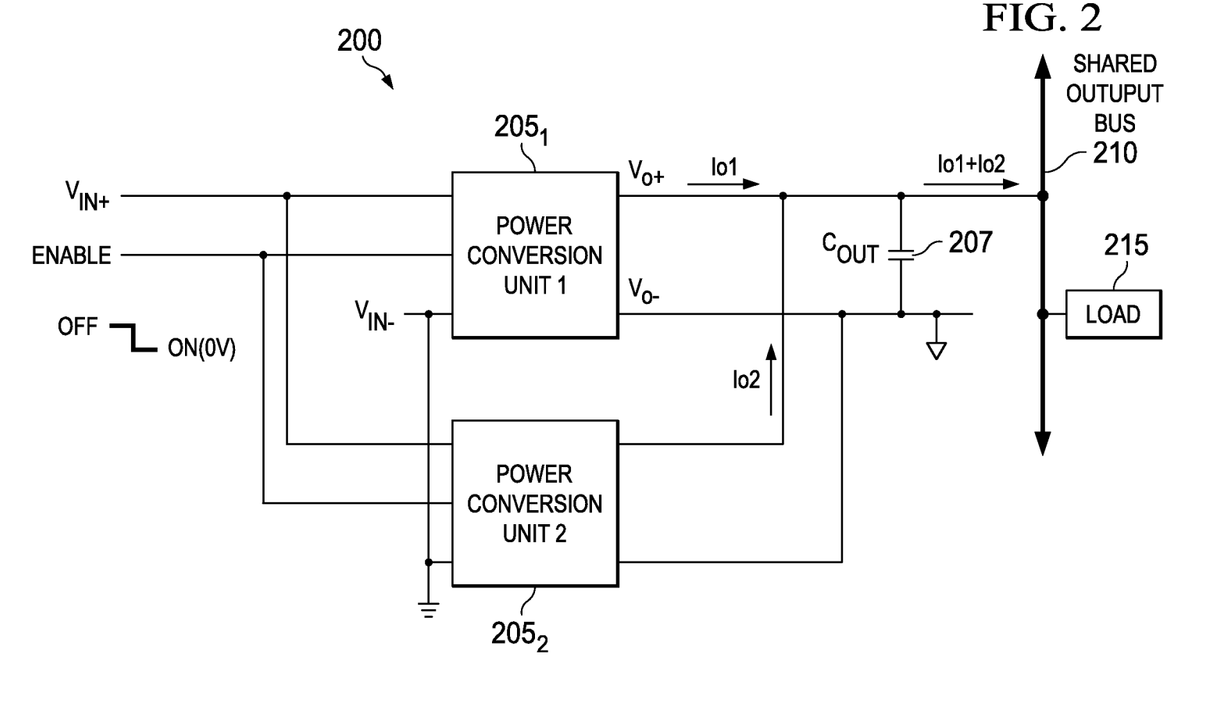
FIG. 2 illustrates a block diagram of a power conversion system having a pair of power conversion units connected to an output bus serving a common load.

FIG. 2 illustrates a block diagram of a power conversion system, generally designated 200, having a pair of power conversion units connected to an output bus serving a common load. The power conversion system 200 includes first and second power conversion units $205_1$, $205_2$ that are parallel connected to a common output capacitor 207 and a shared output bus 210, which serves a common load 215.

Each of the first and second power conversion units $205_1$, $205_2$ (such as the power conversion unit 100 as discussed with respect to FIG. 1) includes a power converter (such as the power converter 105 in FIG. 1) that is coupled to provide an output current (Io1 or Io2) to the shared output bus 210. Additionally, each of the power conversion units $205_1$, $205_2$ includes a delay generator that is configured to generate a start-up delay for its power converter, wherein the start-up delay is activated if a pre-bias value of a common DC bus voltage $V_o$ is greater than a predefined threshold. Each of the power conversion units $205_1$, $205_2$ also includes a voltage controller that controls the output of its respective power converter to maintain a sourcing condition of its output current (Io1 or Io2) during start-up of its power converter.

In the illustrated embodiment, the first and second power conversion units $205_1$, $205_2$ receive a common DC input voltage $V_{IN}$ and provide the common DC bus voltage $V_o$ to the shared output bus 210. Alternatively, there may be separate input voltage supplies. This is utilized at times to provide a redundant input and improve system reliability. The first and second power conversion units $205_1$, $205_2$ are enabled for operation by a common external ENABLE command, as shown. The external ENABLE command may be activated before, after or concurrently with application of the common DC input voltage $V_{IN}$. The common output capacitor 207 may be a summation of output capacitors associated with each of the power conversion units $205_1$, $205_2$ (e.g., the output capacitor 116 of the power conversion unit 100 of FIG. 1), a capacitance associated with the shared output bus 210 or a combination of both. The load 120 may include several POLs having individual loads.

A predefined threshold voltage is a pre-bias value that allows a non-damaging start-up of either of the first and second power conversion units $205_1$, $205_2$. It may be stored in non-volatile memory at manufacture of the first and second power conversion units $205_1$, $205_2$ or be user supplied prior to power conversion system operation.

In a prestart-up situation, each converter controller guides its power conversion unit through an initialization sequence or check that ensures proper power conversion system turn-on conditions are met. These turn-on conditions include determining that there are no general fault conditions present (e.g., over-temperature or improper input voltage conditions) and that a TRUE external ENABLE command and input voltage Vin are present. The time to perform the initialization check may be defined as an initialization check delay. The initialization check delay is usually fixed and may vary slightly from unit to unit depending on variations in timing and parameters.

After the initialization sequence is complete and proper power conversion unit turn-on conditions are met, the converter controller will indicates it is safe to start the power converter. When an ENABLE command is received, the converter controller will measure a bus voltage on the shared output bus to determine if a pre-bias value of the bus voltage is present. If no pre-bias output voltage is present, a soft start is performed by one of the first and second power conversion units $205_1$, $205_2$ until a normal run mode is established with normal output voltage and current load conditions.

In one embodiment, the delay generators of the first and second power conversion units $205_1$, $205_2$ may provide an initialization check delay prior to generation of the start-up delay, wherein each initialization check delay is a fixed length of time plus a randomly selected length of time having minimum and maximum limits. The shorter randomly selected initialization check delay determines which of the first and second power conversion units $205_1$, $205_2$ controls the shared output bus at start-up and provides the soft start noted above. This soft start provides a pre-bias value of the bus voltage, which triggers a start-up delay for the other of the first and second power conversion units $205_1$, $205_2$.

This start-up delay is greater than a maximum soft start ramp time of the DC bus voltage $V_o$, and may be selected from the group consisting of a random length of time with minimum and maximum time limits and a fixed length of time. The minimum time limit is equal to or greater than a maximum ramp time for the power conversion system 200. The maximum time delay may be based on other system constraints and ensures start-up of both units. Additionally, the start-up delay may be one of a set of delays having different lengths of time. At the conclusion of the start-up delay, the other of the first and second power conversion units $205_1$, $205_2$ starts-up into a pre-bias voltage on the shared output bus that is substantially the set point output voltage value of the DC bus voltage $V_o$.

At the conclusion of this start-up delay and when the other of the first and second power conversion units $205_1$, $205_2$ is ready to power up, its voltage controller measures the pre-bias voltage on the shared output bus 210. This voltage controller then calculates a duty cycle and corresponding control loop compensator value that would produce an initial output voltage that is slightly greater than the pre-bias voltage. It may take into account the droop voltage into this calculation. By using a control signal (e.g., a PWM duty cycle) which produces a voltage slightly greater than the pre-bias voltage (for example, 100 mV greater) it ensures that upon start-up, no reverse (sinking) current will flow back into the starting power conversion unit. This PWM duty cycle is then employed at start-up. Alternatively, for control schemes that vary the frequency to control the output, the voltage controller may use an operating frequency at start-up that produces an output voltage that is slightly greater than the pre-bias voltage.

This power conversion unit then produces the output voltage that is slightly greater than the pre-bias voltage using this duty cycle for a pre-determined period. At the end of this period, the control loop is allowed to function, but the output of the bus controller is rate-of-change limited or clamped while it works to bring the bus voltage to the final value determined by the programmed set point and an appropriate voltage droop offset value. This produces a slow and controlled transition of the output current of this power conversion unit coming on the shared output bus, with the first power conversion unit powered up tracking its output current at the same rate to the final sharing current value.

Figure 3:
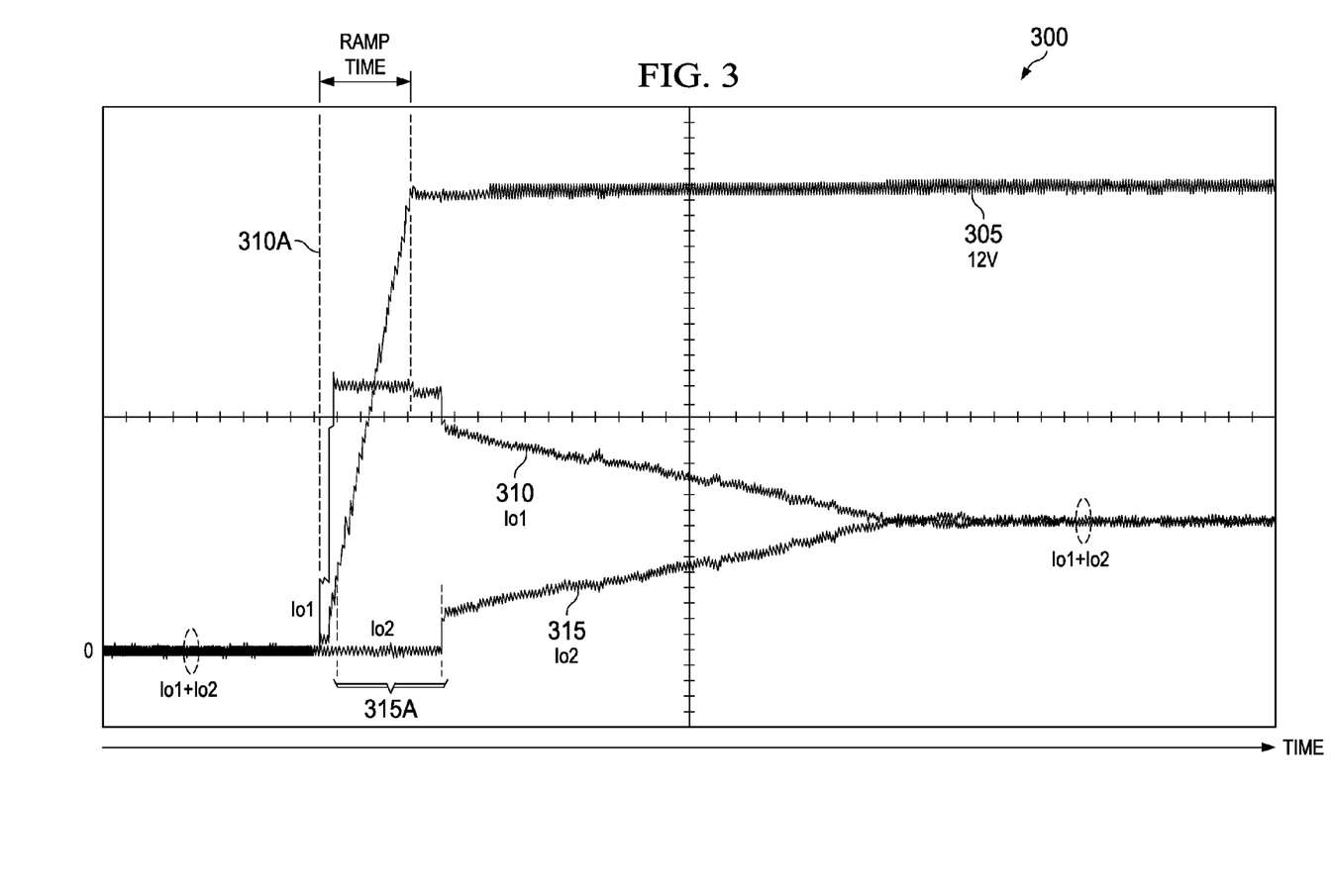
FIG. 3 illustrates a collection of waveforms showing a power conversion system start-up sequence for the first and second power conversion units of FIG. 2.

FIG. 3 illustrates a collection of waveforms, generally designated 300, showing a power conversion system start-up sequence for the first and second power conversion units $205_1$, $205_2$ of FIG. 2. The waveforms 300 show a system start-up sequence that includes a common DC bus voltage (Vo) 305 and first and second power conversion unit output currents (Io1) 310, (Io2) 315.

In the illustrated example, the first power conversion unit $205_1$ responds first to the ENABLE signal for whatever reasons (e.g., differences between the two units in component tolerances, variations in thresholds, or timing delays) and starts-up first at a start line 310A. It may also start first if it has a shorter initialization check delay. Or, for a separate input source arrangement, one input source may come up before another. This produces a ramping voltage on the common DC bus voltage (Vo) 305 that very quickly is greater than a predefined threshold voltage value. This condition is sensed by the second power conversion unit $205_2$, which then produces a start-up delay 315A while the common DC bus voltage (Vo) 305 ramps to a set point value of 12 Vdc due to the first conversion unit output current Io1. The start-up delay 315A is selected to be greater than a ramp time for the common DC bus voltage (Vo) 305 provided by the start-up of the first power conversion unit $205_1$.

At the conclusion of the start-up delay 315A, the voltage controller of the second power conversion unit $205_2$ provides an output voltage that is slightly greater than the pre-bias bus voltage value of 12 Vdc. The first and second conversion unit output currents Io1, Io2 are maintained in a sourcing condition by the first and second voltage controllers until they are substantially equal in providing a final output bus current to the load 215.

Figure 4:
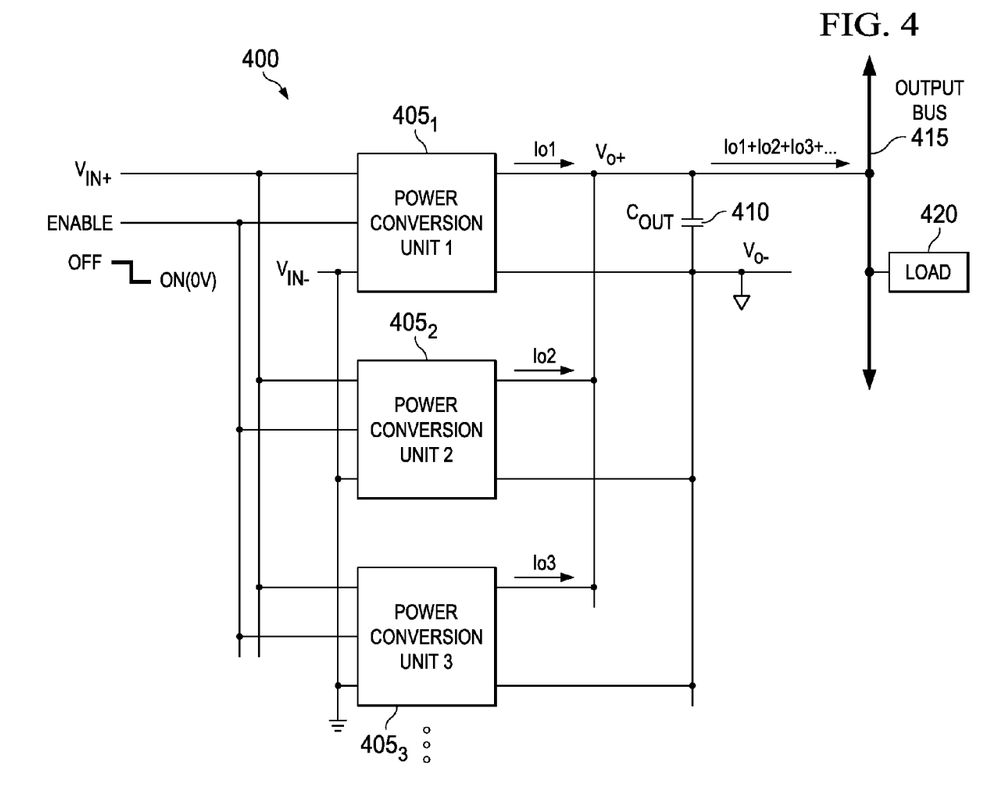
FIG. 4 illustrates a block diagram of another power conversion system showing a plurality of power conversion units connected to an output bus serving a common load.

FIG. 4 illustrates a block diagram of another power conversion system, generally designated 400, showing a plurality of power conversion units connected to an output bus serving a common load. The power conversion system 400 includes first, second and third power conversion units $405_1$, $405_2$, $405_3$ of the plurality that are parallel connected to a common output capacitor 410 and a shared output bus 415, which serves a common load 420. In the illustrated embodiment, the first, second and third power conversion units $405_1$, $405_2$, $405_3$ receive a common DC input voltage $V_{IN}$ and provide a common DC bus voltage $V_o$ to the shared output bus 415. The first, second and third power conversion units $405_1$, $405_2$, $405_3$ are enabled for operation by a common external ENABLE command, as shown. The common output capacitor 410 may consist of those output capacitors both internal to the power conversion units and those connected across the bus as discussed above. General operation of the power conversion system 400 follows that of the power conversion system 200 of FIG. 2.

Figure 5:
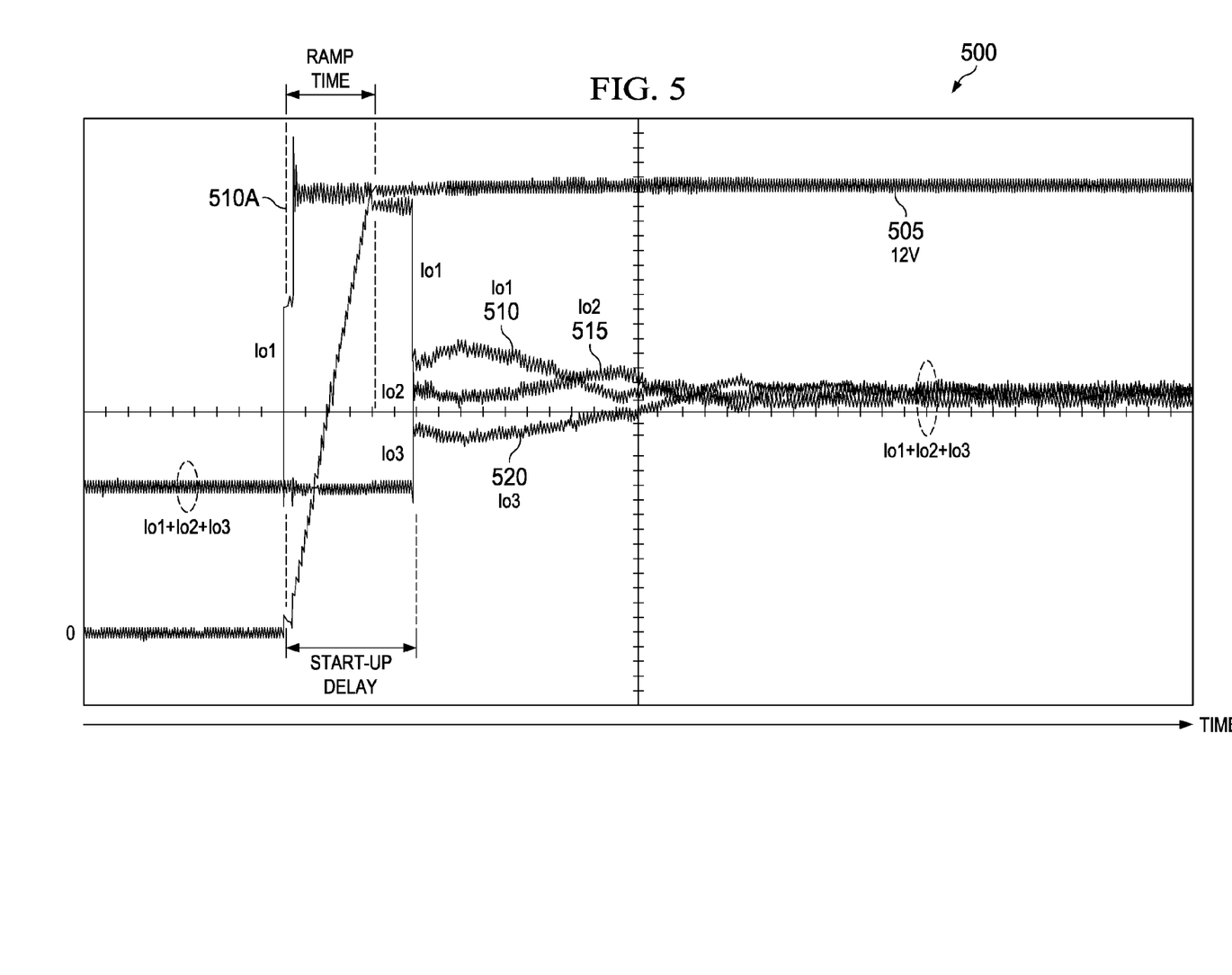
FIG. 5 illustrates another collection of waveforms showing a converter start-up sequence for the first, second and third power conversion units of FIG. 4.

FIG. 5 illustrates another collection of waveforms, generally designated 500, showing a converter start-up sequence for the first, second and third power conversion units $405_1$, $405_2$, $405_3$ of FIG. 4. The waveforms 500 show a converter start-up sequence that includes a common DC bus voltage (Vo) 505 and first, second and third power conversion unit output currents (Io1) 510, (Io2) 515, (Io3) 520.

In the illustrated example, the first power conversion unit $405_1$ starts-up first at a start line 510A wherein the first power converter output current (Io1) 510 provides a soft start ramp time as shown. The second and third power conversion units $405_2$, $405_3$, having reacted slower than unit $405_1$, produce substantially equal start-up delays, as shown, which provides an example of a concurrent (i.e., nearly simultaneous) power conversion unit start-up. Again, the start-up delay is selected to be greater than the ramp time for the common DC bus voltage (Vo) 505. If a random delay time had been employed, there would be three start-ups instead of the two illustrated in FIG. 5

At the conclusion of the start-up delay, the converter controllers of the second and third power conversion unit $405_2$, $405_3$ sense the shared output bus voltage which now is substantially at its set-point value of 12 Vdc. The voltage controller in each of the units $405_2$ and $405_3$ calculates a duty cycle that provides an output voltage that is slightly greater than the sensed pre-bias bus voltage value of 12 Vdc. The calculation may take into account a droop voltage factor. The voltage controllers then initiate start-up of the power converters in units $405_2$ and $405_3$ using that duty cycle. The second and third converter output currents Io2, Io3 are maintained in a sourcing condition by the first and second voltage controllers until all three converter output currents Io1, Io2, Io3 are substantially equal in providing a final output bus current (Io1+Io2+Io3) to the load 415.

The start-up delay, as previously discussed, is activated if a pre-bias value of the output voltage is greater than a predefined threshold. Also the start-up delay may be selected to be equal to the ramp time plus an additional buffer time to insure that there is a stable output bus voltage at the end of the start-up delay period. The start-up delay may be greater than a worst-case ramp time of a setpoint output voltage on the shared output bus. In one embodiment, only one start-up delay may be allowed during a start-up sequence. In this case, no additional delay periods may be needed since the output bus voltage would be substantially at its set point value at the end of the start-up delay and a normal pre-bias start procedure can be used. FIG. 5 is an illustration of this case. Other embodiments may allow a plurality of start-up delays to be enabled.

Additionally, a start-up delay time may not be fixed but be a function of a system variable such as input voltage. Or, it may be selected from a group consisting of a random length of time having minimum and maximum time limits and a fixed length of time. The minimum time limit may be equal to or greater than a maximum ramp time. The start-up delay may be selected from a set of delays having different lengths of time. These delays may be stored in a memory or calculated. The start-up delay time may also be a function of the total output capacitance on the shared output bus if that capacitance is large enough to significantly affect the ramp time. The start-up delay value may be user supplied and programmed into the power conversion units at system assembly.

Figure 6:
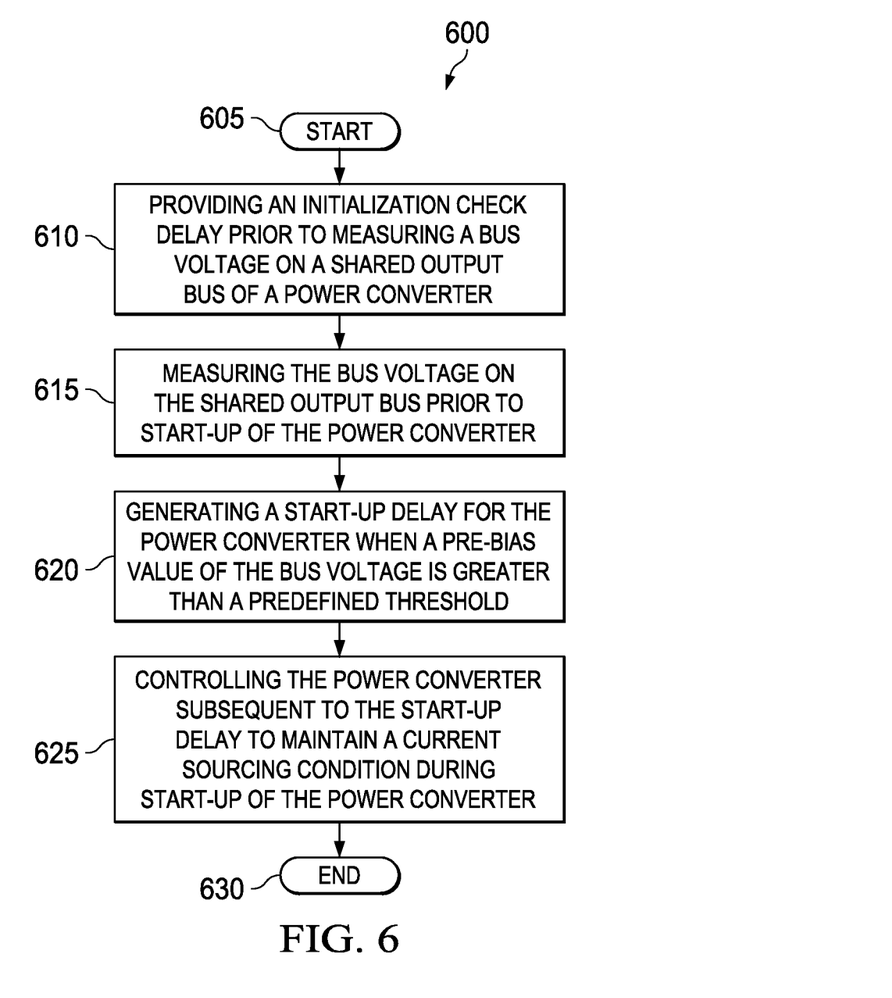
FIG. 6 illustrates a flow diagram of an embodiment of a method of operating a power conversion unit carried out according to the principles of the present disclosure.

FIG. 6 illustrates a flow diagram of an embodiment of a method of operating a power conversion unit, generally designated 600, carried out according to the principles of the present disclosure. The method 600 starts in a step 605, and in a step 610, an initialization check delay is provided prior to measuring a bus voltage on a shared output bus of a power converter. The initialization check delay includes the initialization check delay being a fixed length of time plus a randomly selected length of time with minimum and maximum time constraints.

Then, in a step 615, the bus voltage on the shared output bus is measured prior to start-up of the power converter. A start-up delay is generated for the power converter when a pre-bias value of the bus voltage on the shared output bus is greater than a predefined threshold, in a step 620. The power converter is controlled subsequent to the start-up delay to maintain a current sourcing condition during start-up of the power converter, in a step 625.

In one embodiment, generating the start-up delay includes selecting the start-up delay from the group consisting of a random length of time with minimum and maximum time constraints and a fixed length of time. In another embodiment, generating the start-up delay includes selecting the start-up delay from a set of delays providing different lengths of time. In yet another embodiment, generating the start-up delay includes the start-up delay being greater than a worst-case ramp time of a setpoint output voltage on the shared output bus. In still another embodiment, generating the start-up delay includes the predefined threshold being a magnitude of the pre-bias value that allows a non-damaging start-up of the power converter. The method 600 ends in a step 630.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Power conversion units converting AC to DC may also employ the concepts described herein. Additionally power conversion units having primary side control may also use these concepts. Also, other topologies besides the full-bridge described may use these concepts. Other topologies may include half-bridge, two-switch forward, LLC, forward, or other topologies that have synchronous rectification on an output and may sink output current from a bus or other power sources. Power converter topologies, such as a buck or boost for example, that do not provide input-to-output isolation and may not have primary and secondary stages may also employ the concepts described herein, provided they employ synchronous rectification, can both source and sink output current, have their outputs connected in parallel and do not employ isolating circuitry (e.g., OR-ing diodes or FETs) on their outputs to prevent sinking current into the power conversion units.

Those skilled in the art to which this application relates will appreciate that other and further additions, deletions, substitutions and modifications may be made to the described embodiments.

What is claimed is:
1. A power conversion unit, comprising:
 a power converter having a converter output coupled to a shared output bus;
 a delay generator configured to generate a start-up delay for the power converter, wherein the delay generator is configured to activate the start-up delay if a pre-bias value of a bus voltage on the shared output bus is greater than a predefined threshold, wherein the start-up delay is greater than a worst-case ramp time of a setpoint output voltage on the shared output bus; and a voltage controller configured to control the converter output subsequent to the start-up delay and maintain a current sourcing condition of the converter output during start-up of the power converter.

2. The power conversion unit as recited in claim 1 wherein the start-up delay is selected from the group consisting of:
a random length of time with minimum and maximum time limits; and
a fixed length of time.

3. The power conversion unit as recited in claim 1 wherein the start-up delay is one of a set of delays including different lengths of time.

4. The power conversion unit as recited in claim 1 wherein the predefined threshold is a magnitude of the pre-bias value that allows a non-damaging start-up of the power converter.

5. The power conversion unit as recited in claim 1 further comprising an initialization check delay prior to generation of the start-up delay.

6. The power conversion unit as recited in claim 5 wherein the initialization check delay includes a fixed length of time plus a random length of time selected with minimum and maximum time limits.

7. A method of operating a power conversion unit, comprising:
measuring a bus voltage on a shared output bus prior to start-up of a power converter;
generating a start-up delay for the power converter when a pre-bias value of the bus voltage on the shared output bus is greater than a predefined threshold, wherein the start-up delay is greater than a worst-case ramp time of a setpoint output voltage on the shared output bus; and
controlling the power converter subsequent to the start-up delay to maintain a current sourcing condition during start-up of the power converter.

8. The method as recited in claim 7 wherein generating the start-up delay includes selecting the start-up delay from the group consisting of:
a random length of time with minimum and maximum time constraints; and
a fixed length of time.

9. The method as recited in claim 7 wherein generating the start-up delay includes selecting the start-up delay from a set of delays providing different lengths of time.

10. The method as recited in claim 7 wherein generating the start-up delay includes the predefined threshold being a magnitude of the pre-bias value that allows a non-damaging start-up of the power converter.

11. The method as recited in claim 7 further comprising providing an initialization check delay prior to measuring the bus voltage.

12. The method as recited in claim 11 wherein providing the initialization check delay includes the initialization check delay being a fixed length of time plus a randomly selected length of time with minimum and maximum time constraints.

13. A power conversion system, comprising:
a shared output bus;
a plurality of power conversion units coupled to the shared output bus, each power conversion unit including:
a power converter having a converter output coupled to the shared output bus,
a delay generator that generates a start-up delay for the power converter if a pre-bias value of a bus voltage on the shared output bus is greater than a predefined threshold, wherein the start-up delay is greater than a worst-case ramp time of a setpoint output voltage on the shared output bus, and
a voltage controller that controls the converter output subsequent to the start-up delay and maintains a current sourcing condition of the converter output during start-up of the power converter; and
a load that is coupled to the shared output bus.

14. The power conversion system as recited in claim 13 wherein the start-up delay is selected from the group consisting of:
a random length of time with minimum and maximum time limits; and;
a fixed length of time.

15. The power conversion system as recited in claim 13 wherein the start-up delay is one of a set of delays including different lengths of time.

16. The power conversion system as recited in claim 13 wherein the start-up delay is greater than a worst-case soft start period of the plurality of power conversion units.

17. The power conversion system as recited in claim 13 wherein the predefined threshold is a magnitude of the pre-bias value that allows a non-damaging start-up of each of the plurality of power conversion units.

18. The power conversion system as recited in claim 13 further comprising providing an initialization check delay prior to generation of the start-up delay for at least a portion of the plurality of power conversion units.

19. The power conversion system as recited in claim 18 wherein the initialization check delay includes a fixed length of time plus a randomly selected length of time with minimum and maximum time limits.

* * * * *